Sept. 29, 1970  F. A. LOUGHRIDGE  3,531,677
QUARTZ GLASS ENVELOPE WITH RADIATION-ABSORBING GLAZE
Filed Dec. 14, 1966
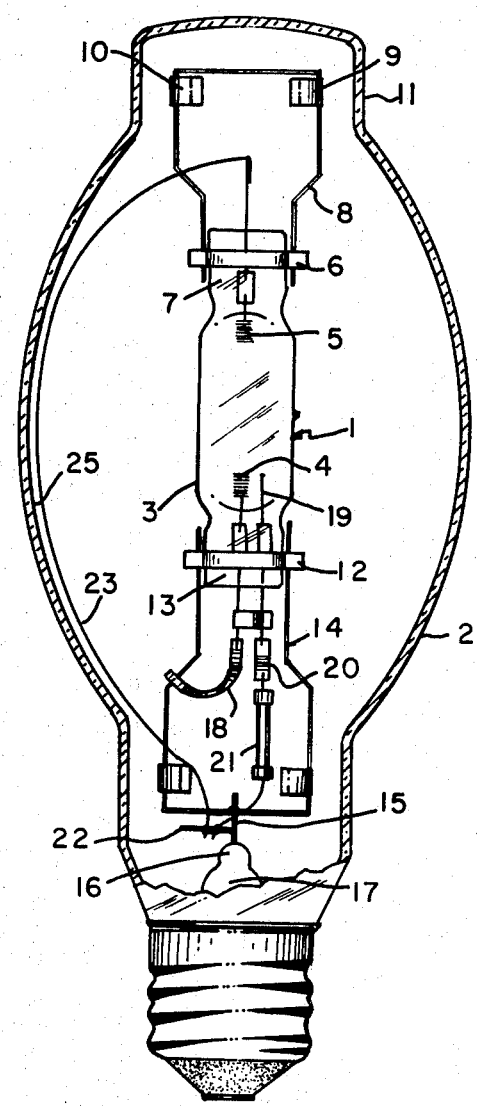
FREDERICK A. LOUGHRIDGE
INVENTOR
BY *Laurence Burns,*
ATTORNEY United States Patent Office 3,531,677
Patented Sept. 29, 1970

3,531,677
QUARTZ GLASS ENVELOPE WITH
RADIATION-ABSORBING GLAZE
Frederick A. Loughridge, Manchester, Mass., assignor to Sylvania Electric Products Inc., a corporation of Delaware
Filed Dec. 14, 1966, Ser. No. 601,643
Int. Cl. H01j 61/40; H01k 1/32
U.S. Cl. 313—112                                    1 Claim

ABSTRACT OF THE DISCLOSURE

In order to reduce hydrogen emission from the inner surface of a glass bulb containing a high-pressure mercury arc, an ultraviolet-absorbing glaze is provided on the quartz. The glaze is made of finely-divided silica frit, with about 2 to 10% by weight of finely-divided alumina, and about 0.05 to 10% of a powdered material such as titanium, cerium, chromium or iron oxide, which absorbs ultraviolet. A coloring material, such as cobalt oxide or vanadium oxide, can be used instead of all or part of the ultraviolet-absorbing material, if color is desired.

BACKGROUND OF THE INVENTION

Field of the invention

This invention relates to electric energy translating devices and particularly to lamps having a high-temperature quartz arc discharge tube enclosed in a larger envelope of glass or the like.

Description of prior art

The effectiveness of such lamps has been reduced by the emission of absorbed hydrogen from the inner surface of the outer bulb, which is usually of glass. This hydrogen eventually gets through the heated quartz arc tube and into the arc atmosphere, shortening the life, making the lamps more difficult to start, and increasing the voltage necessary to sustain the arc discharge.

We have unexpectedly found that the emission of hydrogen from the outer bulb can be reduced or prevented by using on the outer or inner surface of the quartz arc tube a glaze which will absorb ultraviolet light. The reason appears to be that the hydrogen absorbed in the glass of the outer jacket is released by the photochemical effect of ultraviolet light on the glass.

SUMMARY OF THE INVENTION

The glaze used on the quartz arc tube must be composed mainly of quartz, or vitreous silica, preferably the latter, but we have found that about 2% to 10% of alumina by weight must be present in the silica if the glaze is to melt at a temperature low enough for application to the quartz arc tube. This amount of alumina forms a eutectic with the quartz, and is sufficient to lower the melting point but not sufficient to alter the coefficient of expansion of the glaze enough to prevent adherence to the quartz. About 0.05% to 10% of an ultraviolet-absorbing material or a coloring material, or both, is also added to the glaze to achieve the desired result.

The quartz used in the glaze is preferably ground vitreous silica, and the alumina is added as finely divided powder. The absorbing or coloring material is also added as a fine powder. Oxides of iron, cerium, chromium and titanium are among the ultraviolet-absorbing agents which can be used. If color is desired, cobalt oxide will give blue, nickel green, and so forth, as is known to the art.

The glaze can be applied to the quartz arc tube in a suitable liquid medium, for example, a mixture of alcohol and water, and after drying, heated until it melts onto the quartz surface and adheres to it. The arc tube can then be cooled, mounted on a stem and sealed into a glass outer envelope in the usual manner.

The glaze can also be used when it is desired to color quartz, or make it absorbing, for other reasons than given here, or in other devices or for other uses. For example, it can be used on the envelope of a tungsten halogen incandescent lamp.

BRIEF DESCRIPTION OF THE DRAWING

Further aspects of the invention will be apparent from the following description, taken in connection with the accompanying drawing, which shows a device according to the invention. The device is a high-pressure discharge lamp.

DESCRIPTION OF PREFERRED EMBODIMENTS

In the drawing, the high-pressure mercury lamp which can contain iodides of mercury and other suitable metals, if desired, in the usual manner, and a starting gas such as argon, has the outer glass envelope 2 and the arc tube 1 the latter having a layer 3 of an ultraviolet-absorbing glaze over its outer surface. Electrodes 4, 5 are set at opposite ends of arc tube 1, and are sealed therethrough by sealing a molybdenum ribbon through the glass, as is known in the art. A nickel strap 6 is firmly clamped around the flat end 7 of arc tube 1 and a somewhat U-shaped wire frame 8 extends from the nickel strap 6 to the curved flat springs 9, 10 which bear against the sides of the top tubular portion 11 of outer envelope 2 to hold the arc tube 1 in alignment.

At the bottom of the arc tube 1 in the figure another nickel strap 12, is fitted closely around the flat end 13 of arc tube 1, and a somewhat U-shaped wire support frame 14 extends from the strap 12 to a lead-in wire 15 extending into and sealed through the press 16 of stem 17 of the outer envelope 2. The arc electrode 4 is connected to the frame 14 by flexible metal strip 18. The auxiliary starting electrode 19 is connected through nickel strip 20 and starting resistor 21 to the bent-over lead-in wire 22, insulated from the other lead-in wire 15, and a conducting wire 23 extends from said lead-in 22 to the electrode 5 at the top of the arc tube 1 in the drawing. The wire 23 extends close to, but is spaced from the outer envelope 2, so that it will be as far as possible from the arc tube 1, to reduce electrolysis through the glass.

The outer envelope 2 is filled with an inert gas such as argon, in the usual manner.

The general construction of the lamp is described in more detail in copending United States patent application Ser. No. 448,964, filed Apr. 17, 1965 by Warren C. Gungle et al.

A glaze 3 is present on the outer light-emitting surface of arc tube 1 to absorb ultraviolet light and prevent its reaching the inner surface 25 of outer envelope 2, where it would release the hydrogen absorbed in the glass, thereby allowing it to collect in the space between the two envelopes, and to penetrate the hot quartz of the arc tube 1, quartz being pervious to hydrogen.

The presence of hydrogen would increase the starting and sustaining voltages of the lamp and reduce the useful life.

A very effective glaze can be made from the following three components:

(A) Ground vitreous silica of less than 200 mesh

This is the main component, and is used in preference to crystalline quartz because of its lower fusion temperature and low expansion coefficient. By "silica" of less than 200 mesh" we mean silica in which the particles can pass through a 200 mesh screen.

(B) Finely divided alumina, such as that available from Linde Air Products, Bayonne, N.J., and known as Linde #A 5175.

The alumina is used to the extent of 2% to 10% by weight and lowers the fusion temperature of the resultant glaze. Small amounts of alumina lower the fusion temperature greatly without changing the expansion coefficient to the point where a serious mismatch occurs.

(C) Coloring oxides to the extent of .05% up to 10%

The coloring oxide must be very finely divided. The following oxides will produce the colors specified:

(1) Vanadium oxide____ Black.
(2) Copper oxide_____ Red (fluorescent).
(3) Iron oxide_____ Light green (U.V. absorbing).
(4) Cerium oxide_____ Colorless (U.V. absorbing).
(5) Nickel oride_____ Brownish green.
(6) Titanium oxide____ Colorless (U.V. absorbing).
(7) Cobalt oxide_____ Purple-blue.
(8) Chromium oxide___ Light blue (U.V. absorbing).

The procedure for glazing, is to combine components A, B and C and add a mixture of 60% isopropyl alcohol and 40% water as a vehicle, adjusting the viscosity so that it is suitable for spray or dip coating. The mixture is ball-milled 48 hours and then sprayed or dip-coated in a thin layer onto the quartz tube to be glazed. The coating is then dried in air about 30 minutes at about 180° F.

The arc tube with its coating is then fired at about 1050° C. for two hours in a suitable furnace. The piece is then cooled and removed and the fusion completed with a gas-oxygen flame or in a high temperature furnace capable of heating the composite to 1700° C.

The word "Fluorescent" after "Red" in the table above means that the red color is produced by fluorescence. The ultraviolet-absorbing glasses are noted as "U.V. absorbing."

Although a specific embodiment has been described above, various modifications will be apparent to a person skilled in the art, without departing from the spirit and scope of the invention as set forth in the claim.

What we claim is:

1. An electric energy-translating device comprising a quartz lamp envelope for said device having a glaze fused over its surface, said glaze consisting essentially of silica, alumina in the amount of about 2% to 10% by weight and an ultraviolet-absorbing material, and an outer glass envelope sealed around said quartz envelope and spaced therefrom, the glass of said outer glass envelope containing absorbed hydrogen which if released would be deleterious to an electric discharge in said quartz arc envelope.

References Cited
UNITED STATES PATENTS

| | | | |
|---|---|---|---|
| 2,030,390 | 2/1936 | Navias | 313—221 |
| 2,104,073 | 1/1938 | Druyvesteyn et al. | 313—221 |
| 2,568,459 | 9/1951 | Noel | 313—221 X |
| 2,974,052 | 3/1961 | Bacon | 106—52 |
| 3,148,300 | 9/1964 | Graff | 313—221 |

JAMES W. LAWRENCE, Primary Examiner

D. O'REILLY, Assistant Examiner

U.S. Cl. X.R.

313—221